(12) United States Patent
Gordon et al.

(10) Patent No.: US 9,159,071 B2
(45) Date of Patent: Oct. 13, 2015

(54) INFORMATION BASED INDICIA DISCOUNT COUPON

(75) Inventors: Roy R. Gordon, Gaithersburg, MD (US); Wayne A. Wilkerson, Manassas, VA (US)

(73) Assignee: THE UNITED STATES POSTAL SERVICE, Washington, DC (US)

(*) Notice: Subject to any disclaimer, the term of this patent is extended or adjusted under 35 U.S.C. 154(b) by 1923 days.

(21) Appl. No.: 10/450,778

(22) PCT Filed: Dec. 21, 2001

(86) PCT No.: PCT/US01/48953
§ 371 (c)(1),
(2), (4) Date: Jun. 18, 2003

(87) PCT Pub. No.: WO02/49855
PCT Pub. Date: Jun. 27, 2002

(65) Prior Publication Data
US 2004/0030662 A1 Feb. 12, 2004

Related U.S. Application Data

(60) Provisional application No. 60/256,977, filed on Dec. 21, 2000.

(51) Int. Cl.
*G06Q 30/00* (2012.01)
*G06Q 30/02* (2012.01)

(52) U.S. Cl.
CPC ............ *G06Q 30/02* (2013.01); *G06Q 30/0225* (2013.01); *G06Q 30/0235* (2013.01); *G06Q 30/0277* (2013.01)

(58) Field of Classification Search
CPC .......... G06Q 30/0207; G06Q 30/0211; G07B 17/00508; G07B 17/0058; G07B 17/0588

USPC .................................................... 705/14, 401
See application file for complete search history.

(56) References Cited

U.S. PATENT DOCUMENTS 4,660,221 A 4/1987 Dlugos
4,731,741 A * 3/1988 Allen .......................... 358/1.12

(Continued)

FOREIGN PATENT DOCUMENTS

EP 0 408 348 A2 1/1991
EP 1022688 A2 7/2000

OTHER PUBLICATIONS

International Search Report in PCT/US01/48953, mailed Sep. 18, 2002 (5 pages).

(Continued)

*Primary Examiner* — John G Weiss
*Assistant Examiner* — Vincent Cao
(74) *Attorney, Agent, or Firm* — Finnegan, Henderson, Farabow, Garrett & Dunner L.L.P.

(57) ABSTRACT

A method and article for increasing the opening/reading rate of mail and thus adding value to advertising by mail. A coupon value is embedded within a machine readable code of an information based indicia used as postage evidence on each piece of a mailing. The amount of the coupon and type of coupon can be determined by the customer creating the mailing. The information based indicia is digitally signed prior to printing, allowing a redeeming vendor to verify the authenticity of a coupon, preventing fraud and changing of data within the information based indicia. In addition, the customer originating the mailing may obtain marketing information such as mailing date, type of products purchased, after the coupon is redeemed.

20 Claims, 4 Drawing Sheets

(56) References Cited

U.S. PATENT DOCUMENTS

| | | | |
|---|---|---|---|
| 4,835,713 A | 5/1989 | Pastor | |
| 4,908,761 A * | 3/1990 | Tai | 705/14.26 |
| 5,053,955 A * | 10/1991 | Peach et al. | 705/14.47 |
| 5,227,874 A * | 7/1993 | Von Kohorn | 705/7.32 |
| 5,239,168 A * | 8/1993 | Durst et al. | 235/432 |
| 5,468,945 A | 11/1995 | Huggett et al. | |
| 5,612,889 A | 3/1997 | Pintsov et al. | |
| 5,936,865 A | 8/1999 | Pintsov et al. | |
| 6,141,654 A | 10/2000 | Heiden et al. | |
| 6,173,274 B1 | 1/2001 | Ryan, Jr. | |
| 6,178,411 B1 | 1/2001 | Reiter | |
| 6,327,580 B1 | 12/2001 | Pierce et al. | |
| 6,336,098 B1 * | 1/2002 | Fortenberry et al. | 705/14.23 |
| 6,356,883 B1 | 3/2002 | Katikaneni et al. | |
| 6,530,523 B1 * | 3/2003 | Oakeson et al. | 235/462.01 |
| 6,619,544 B2 * | 9/2003 | Bator et al. | 235/381 |
| 6,839,691 B2 * | 1/2005 | Bator et al. | 705/59 |
| 6,934,839 B1 * | 8/2005 | Pagel | 713/156 |
| 7,257,558 B2 | 8/2007 | Schwartz et al. | |
| 7,458,612 B1 | 12/2008 | Bennett | |
| 7,769,694 B2 * | 8/2010 | Schwartz et al. | 705/60 |
| 2001/0014868 A1 * | 8/2001 | Herz et al. | 705/14 |
| 2001/0034716 A1 * | 10/2001 | Goodwin | 705/60 |
| 2002/0026430 A1 * | 2/2002 | Ryan, Jr. | 705/404 |
| 2002/0046182 A1 | 4/2002 | Bator et al. | |
| 2002/0060246 A1 * | 5/2002 | Gobburu et al. | 235/462.46 |
| 2002/0073040 A1 * | 6/2002 | Schwartz et al. | 705/62 |
| 2003/0111524 A1 * | 6/2003 | Wells et al. | 235/375 |

OTHER PUBLICATIONS

PCT Written Opinion (PCT Rule 66) in PCT/US01/48953, mailed Apr. 21, 2003 (5 pages).

International Preliminary Examination Report in PCT/US01/48953, mailed Oct. 1, 2003 (6 pages).

Canadian Office Action in Canadian Application No. 2,431,105, mailed Feb. 24, 2010 (three pages).

Canadian Office Action in Canadian Application No. 2,431,105, mailed Feb. 23, 2011 (three pages).

Canadian Office Action dated Aug. 20, 2013 in Canadian Patent Application No. 2,431,105, 3 pages.

* cited by examiner

| Data Elements | Barcode Data | Human-Readable Data | Length (bytes) | Field Number |
|---|---|---|---|---|
| Indicia Version Number | Yes | No | 1 | 1 |
| Algorithm ID | Yes | No | 1 | 2 |
| Certificate Serial Number | Yes | No | 4 | 3 |
| Device ID | | | | |
| - PSD Manufacturer ID | Yes | Yes | 2 | 4 |
| - PSD Model ID | Yes | Yes | 2 | 5 |
| - PSD Serial Number | Yes | Yes | 4 | 6 |
| Ascending Register | Yes | No | 5 | 7 |
| Postage | Yes | Yes | 3 | 8 |
| Date of Mailing | Yes | Yes | 4 | 9 |
| Originating Address: | | | | |
| - City, State, ZIP Code | No | Yes | — | — |
| - Registration ZIP Code | Yes | No | 4 | 10 |
| Reserved Field 1 | Yes | No | 5 | 11 |
| Software ID | Yes | No | 6 | 12 |
| Descending Register | Yes | No | 4 | 13 |
| Mail Class or Category | | | | |
| - Rate Category | Yes | No | 4 | 14 |
| - Endorsement (Mail Class) | No | Yes | — | — |
| Digital Signature | Yes | No | DSA 40 / RSA 128 / ECDSA 40 | 15 |
| Reserved Field 2 | Yes | No | Variable Size | 16 |

Fig. 4

INFORMATION BASED INDICIA DISCOUNT COUPON

RELATED APPLICATIONS

This application claims the benefit of U.S. Provisional Patent Application No. 60/256,977, entitled "Information Based Indicia Discount Coupon," which was filed on Dec. 21, 2000, the content of which is incorporated by reference herein.

BACKGROUND OF THE INVENTION

1. Field of the Invention

The present invention relates to adding value to mail pieces such as envelopes and postcards containing or bearing advertising material or retail information sent to retail customers. This invention particularly relates to embedding discount coupon values within evidence of U.S. postage.

2. Description of the Related Art

Presently, many advertisers mail coupons or marketing materials contained within an envelope. Many recipients of these envelopes throw them away without ever opening the envelopes. Other retailers utilize postcards as coupons. However, even if a recipient does not throw away the postcard and instead redeems it, the issuer of the coupon has no way of tracking which recipient redeemed the coupon, how long after the coupon was mailed it was redeemed, or whether the coupon is genuine or counterfeit.

Thus, there is a need to provide a way for retailers to add value to envelopes to encourage recipients to open and/or keep the envelopes. In addition, there is a need to provide the retailers with a way to obtain information about the recipients who redeem the mailings.

SUMMARY OF THE INVENTION

Advantages associated with certain aspects of the invention include adding value to envelopes and postcards for customers buying and printing postage, preferably in bulk. The present invention may also increase the opening/read rate of advertisements sent by mail (sometimes referred to by the public as "junk mail"), which adds value to advertising by mail. Additionally, another advantage of certain aspects of the invention is to allow the customers of U.S. Postal Service to obtain information about the use of advertising mailings by the recipients of such mailings.

To achieve the advantages and in accordance with the purpose of the invention, as embodied and broadly described herein, the invention provides a method of providing a coupon and evidence of postage on a mail piece, comprising; determining a coupon value to be included in an information based indicia to be included on a mail piece evidence of postage, embedding the coupon value within a machine readable code, digitally signing the information based indicia including the coupon value, and printing the evidence of postage including the coupon value on each mail piece.

Additional advantages and purposes of the invention may be accomplished by providing a machine readable indicia for providing information and evidence of postage paid on a mail piece comprising; machine readable marks indicating postage, machine readable marks indicating a coupon value configured to permit a recipient of the mail piece to redeem the mail piece for the coupon value.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

BRIEF DESCRIPTION OF THE DRAWINGS

FIG. 4 is a table indicated the various fields and information contained in the 2D barcode of FIG. 3.

DESCRIPTION OF THE PREFERRED EMBODIMENTS

Reference will now be made in detail to the present preferred embodiments of the invention, an example of which is illustrated in the accompanying drawings. Wherever possible, the same reference numbers will be used throughout the drawings to refer to the same or like elements or process steps.

Presently, many persons/customers utilize PC Postage products to provide postage on their mailings. Products for postage purchase and printing from a computer using standard ink jet and laser jet printers are developed by commercial providers and approved by the U.S. Postal Service. Different companies offer product variations, but all are held to U.S. Postal Service requirements to ensure security and appropriate interface with Postal Service operations. Customers are afforded options and opportunities to select the products that best meet their business needs, and such customers require assurance of compliance with Postal Service requirements. PC Postage is a trademark owned by the U.S. Postal Service used on qualified PC Postage products offered by approved and licensed vendors. The products purchased and printed on the mailings are generally referred to as evidence of U.S. postage.

Figure 2:
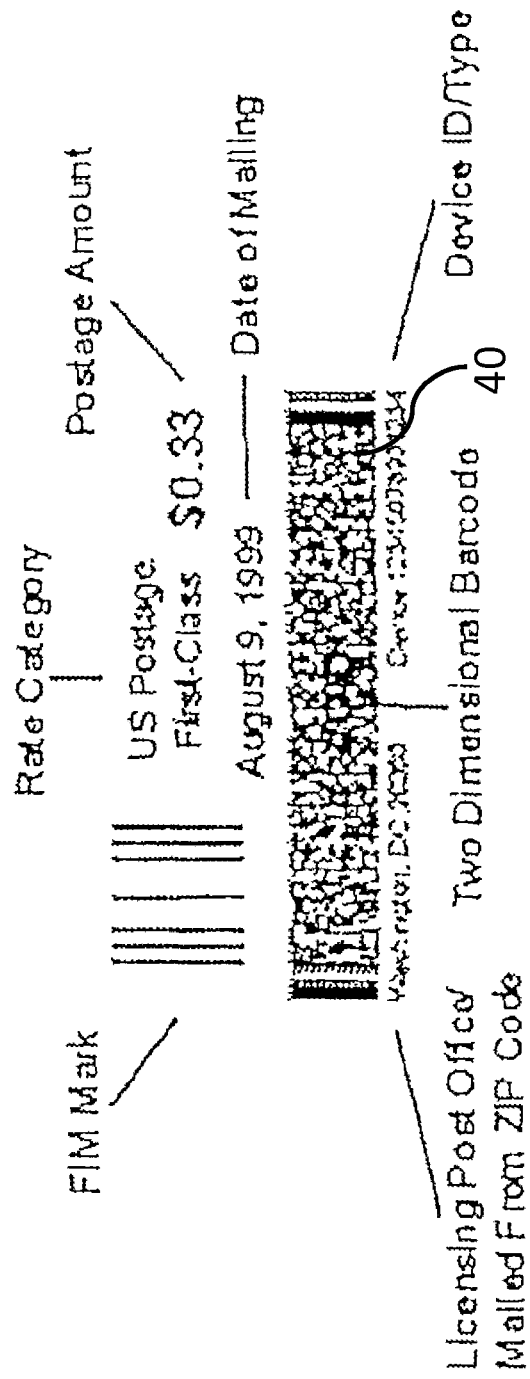
FIG. 2 is an example of a 2D barcode used by the U.S. Postal Service.

One way of providing evidence of postage is to utilize indicia on the mail piece such as a stamp, meter mark, or machine or human readable code. A machine readable code may include a barcode. Currently, PC Postage providers utilize a 2D barcode as evidence of U.S. postage, although other types of machine readable codes may be used. An example of such a barcode is shown in FIG. 2. The 2D barcode (40) is printed on the envelope with other information regarding the mailing. The entire evidence of postage is commonly called an Information Based Indicia (IBI). The IBI, like other forms of postage such as stamps and meter impressions, is printed on an envelope in the upper right hand corner, or on a label for an envelope or package. It conveys evidence that postage has been paid and contains mail processing data requirements. In addition, the IBI contains security-related data elements. The indicia is made up of human readable information as well as a two dimensional barcode. FIG. 4 is a table showing information contained in 2D barcode used by the Postal Service. The information includes: licensing zip code, destination delivery point, software ID, ascending register, descending register, algorithm ID, device ID, date of mailing, postage, digital signature, rate category, reserve field, indicia version number, and certificate serial number. The code may also reflect the date the code or indicia was printed. Of particular use in the present invention is the reserve field within the 2D barcode currently used by the Postal Service.

Figure 1:
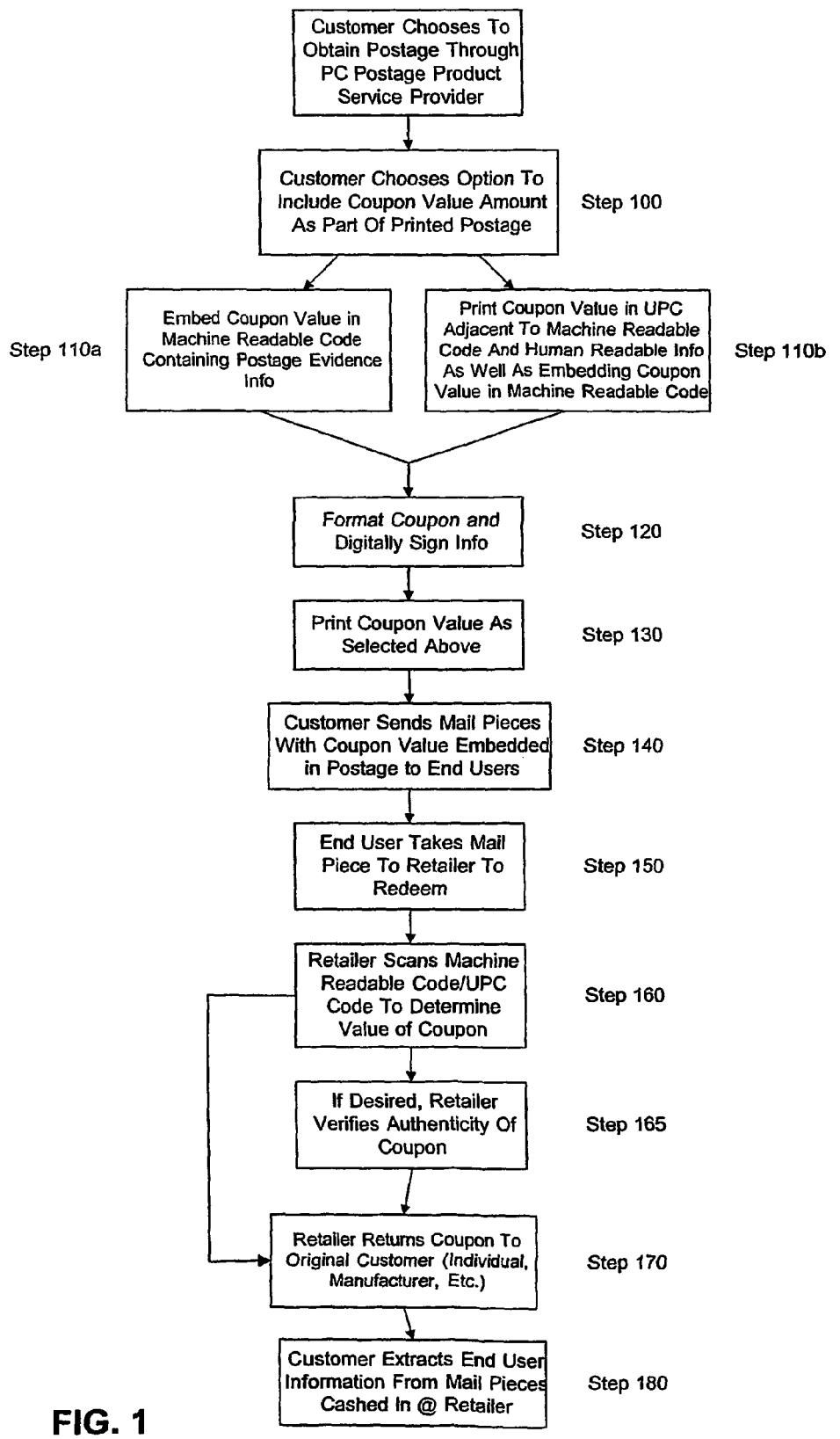
FIG. 1 is a flow chart illustrating a process of embedding value in evidence of U.S. postage according to the present invention.

Thus, for purposes of the present invention and as embodied in FIG. 1, it is possible for a customer using PC postage to select to include a coupon value amount in the reserve field (step 100).

Having decided to include a coupon value, the customer may choose to include the information in one of at least two ways. The customer may choose to embed the coupon value in the machine readable code such as a 2D barcode containing the postage evidence information (step 110a). Alternatively, the customer may choose print the coupon value in a second machine readable code such as a UPC barcode adjacent to the first machine readable code with human readable information represented by the IBI and to embed the coupon value in the first machine readable code (step 110b). For example, the customer can choose to include the information that the envelope has a value of 20% off purchase or perhaps a fixed price reduction such as a $20.00 discount. Optionally the code may also reflect an expiration date for the coupon in machine or human readable form.

Figure 3:
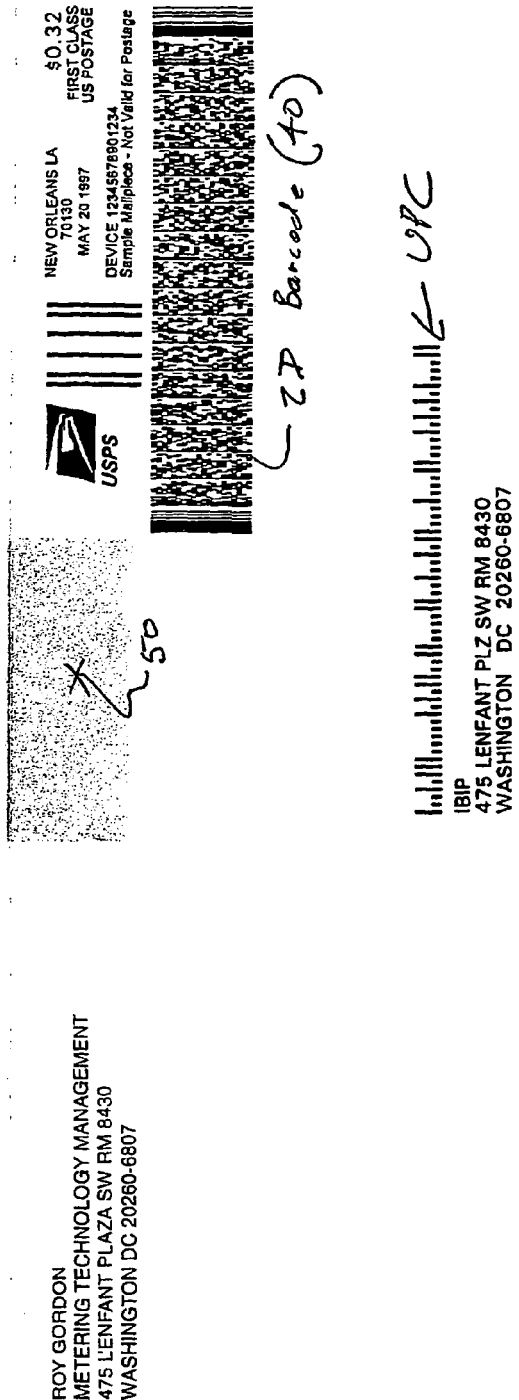
FIG. 3 is an envelope having an example of a 2D barcode according to the present invention and indicating an advertising area on the envelope.

In one optional embodiment, the discount coupons may appear in the reserve field (step 110a) of the 2D barcode seen in PC postage. In addition, in some other area of the mail piece such as an area shown shaded in FIG. 3, noted by reference number 50, and referred to in this document as the advertising art area. For example, the customer may include information in human readable form that the envelope is worth 20% off a purchase or a $20.00 discount off a next purchase (step 110b). Such information may also be included in the reserve field of the 2D barcode 40, or in some other area of a machine readable code. It should be understood that one optional embodiment of the invention includes using software on a personal computer and printer, such as PC postage for example, to generate and print the indicia. However, other optional embodiments of this invention may include other means such as, but not limited to, large commercial printing machines to print the indicia. The machine readable indicia itself may take on a number of different forms.

Once the customer has input the necessary information, the postage, including the coupon value embedded within the postage, will be printed. In preparing the information input by the customer for printing as postage evidence, the PC postage product formats the applicable barcodes containing the necessary information and digitally signs the information. This aspect of PC postage is one example of how step 120 may be accomplished. Thus, for IBI, a security device creates a unique digital signature that is included in the barcode of each mail piece. This unique digital signature makes it possible to detect counterfeiting, as discussed further later. After the coupon is formatted and digitally signed, the postage evidence is printed (step 130).

After the postage evidence is printed, the customer mails the envelopes having the postage evidence, including the embedded coupon value, to a list of recipients (step 140). In this manner, the mail piece may be distributed to addresses on a mailing list. Because of the use of the IBI, it is possible for the customer mailing the envelopes to obtain information regarding the recipients who redeemed their envelopes at a retailer. It should be understood that the customer originating the mailing may be, for example, an individual proprietor, a retailer, a home office of a large franchise, or a manufacturer of goods sold through a retailer. In addition, the coupon value may be for a percentage discount, a specific cash amount, or specific to a particular product.

The recipient of the mailing can take the envelope to a redeeming vendor and redeem it, for example, at an individual proprietor's shop if the proprietor is the originator of the coupon, or at a franchise outlet or a retail outlet (step 150). The redeeming vendor scans the machine readable code to determine the coupon value amount (step 160). The redeeming vendor may also verify the authenticity of the coupon by using commercially available software to decode and verify the digital signature (step 165). Alternatively, this authentication process may be carried out at a later time. For instance, if the redeeming vendor is not the originating customer, authenticity may not be verified until the coupon is returned to the originating customer (step 170). Scanning technology is used to read the machine readable information and verify its unique relationship to the mail piece. Further, duplicates detected in the mail stream would indicate fraud. The digital signature is used to verify the information in the barcode has not been tampered with or changed in any way.

In addition to determining the validity and value of the coupon, the redeeming vendor, or the originating customer, may extract additional marketing information from the IBI (step 180). For example, it may be possible to determine how long after the mailing the coupon was redeemed, the types of products the coupon was redeemed for, and other valuable marketing information.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for providing a coupon value and a postage value to a mail piece, comprising:
   receiving coupon information and a postage value associated with a mail piece from a sender of the mail piece, the coupon information comprising an offer for a discount related to the purchase of goods or services;
   generating, via a computer processor, a single information-based indicia representing the coupon information, the postage value, and a mailing date of the mail piece;
   providing, via the computer processor, the indicia in a machine-readable format to the mail piece;
   reading the indicia via a scanning device to:
      determine the coupon information; and
      determine the mailing date of the mail piece;
   exchanging the mail piece for the discount related to the purchase of the goods or services;
   determining marketing information related to the exchange based on at least the mailing date of the mail piece, the marketing information including at least information indicating how much time elapsed between the sending of the mail piece and the exchange of the mail piece for the discount; and
   transmitting the marketing information to the sender of the mail piece.

2. The method of claim 1, wherein the indicia is provided to the mail piece as a barcode.

3. The method of claim 2, wherein the barcode includes a 2-dimensional barcode.

4. The method of claim 2, the recipient is associated with a mailing list.

5. The method of claim 4, further comprising determining, via the computer processor, the type of product for which the coupon was redeemed.

6. The method of claim 1, wherein the scanning device is a barcode scanning device.

7. The method of claim 1, wherein the providing is performed via a printer.

8. The method of claim 1, wherein the single information-based indicia further represents a digital signature.

9. A system for providing an information-based indicia to a mail piece, comprising:
 a memory;
 a database;
 a computer processor coupled to the memory and the database, the processor configured to:
  receive coupon information and a postage value associated with a mail piece from a sender of the mail piece, the coupon information comprising an offer for a discount related to the purchase of goods or services,
  generate a single information-based indicia representing the coupon information, the postage value, and a mailing date of the mail piece; and
  provide the indicia in a machine-readable format to the mail piece;
 a scanning device configured to determine, after the mail piece has been exchanged for the discount related to the purchase of the goods or services, the coupon information and the mailing date of the mail piece, wherein the scanning device is in communication with the processor and the processor is further configured to determine marketing information related to the exchange based on at least the mailing date of the mail piece, the marketing information including at least information indicating how much time elapsed between the sending of the mail piece and the exchange of the mail piece for the discount; and
 a transmitting device configured to transmit the marketing information to the sender.

10. The system of claim 9, wherein the indicia is provided to the mail piece as a barcode.

11. The system of claim 10, wherein the barcode includes a 2-dimensional barcode.

12. The system of claim 9, wherein the scanning device is a barcode scanning device.

13. The system of claim 9, the recipient is associated with a mailing list.

14. The system of claim 13, wherein the processor is further configured to receive receipt information indicating receipt of the mail piece from the recipient.

15. The system of claim 13, wherein the processor is further configured to determine the type of product for which the coupon was redeemed.

16. The method of claim 8, further comprising reading the indicia via a scanning device to verify authenticity of the indicia using the digital signature.

17. The system of claim 9, wherein the single information-based indicia further represents a digital signature.

18. The system of claim 17, wherein the scanning device is further configured to scan the indicia in order to verify authenticity of the indicia using the digital signature.

19. A non-transitory computer-readable storage medium storing instructions for causing a processor to perform a method for providing a coupon value and a postage value to a mail piece, the method comprising the steps performed by the processor of:
 receiving coupon information and a postage value associated with a mail piece from a sender of the mail piece, the coupon information comprising an offer for a discount related to the purchase of goods or services;
 generating a single information-based indicia representing the coupon information, the postage value, and a mailing date of the mail piece;
 directing a printing component to provide the indicia in a machine-readable format to the mail piece;
 directing, after the mail piece has been exchanged for the discount related to the purchase of the goods or services, a scanning device to read the indicia to:
  determine the coupon information; and
  determine the mailing date of the mail piece;
 determining marketing information related to the exchange based on at least the mailing date of the mail piece, the marketing information including at least information indicating how much time elapsed between the sending of the mail piece and the exchange of the mail piece for the discount; and
 transmitting the marketing information to the sender of the mail piece.

20. The non-transitory computer-readable storage medium of claim 19, wherein the indicia is provided to the mail piece as a barcode.

* * * * *